May 21, 1929.  E. EGER  1,713,753
TIRE TESTING MACHINE
Filed Aug. 30, 1927
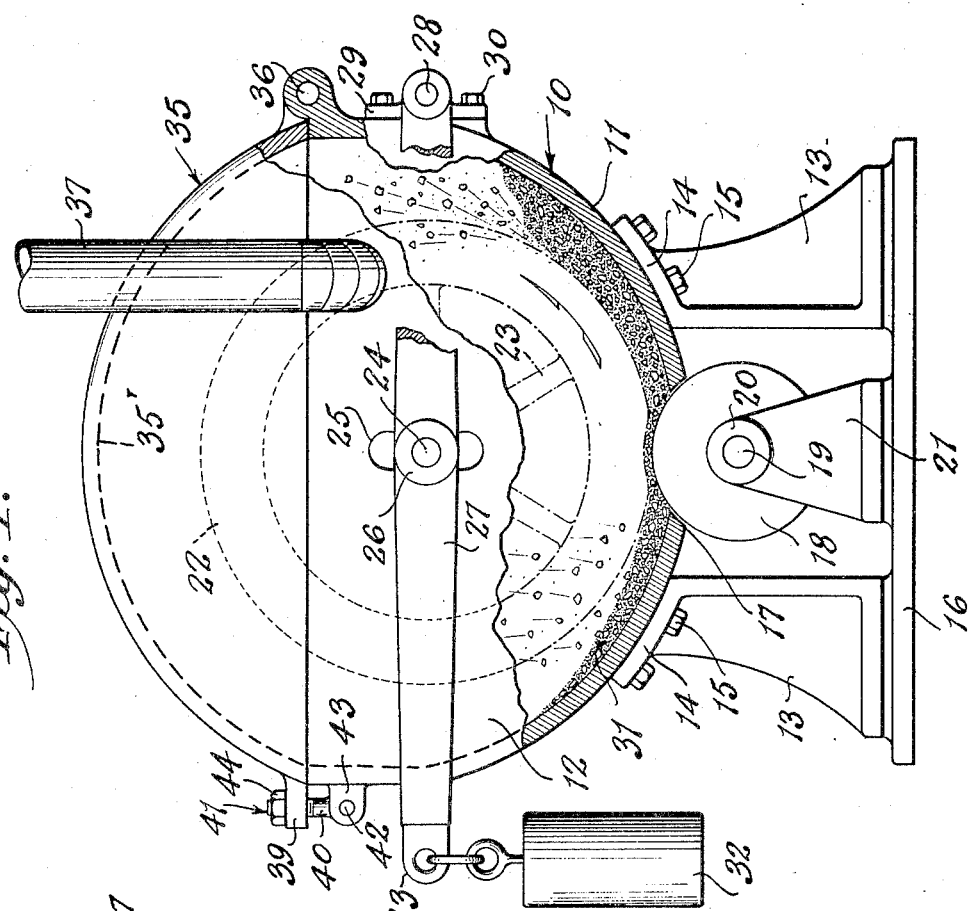
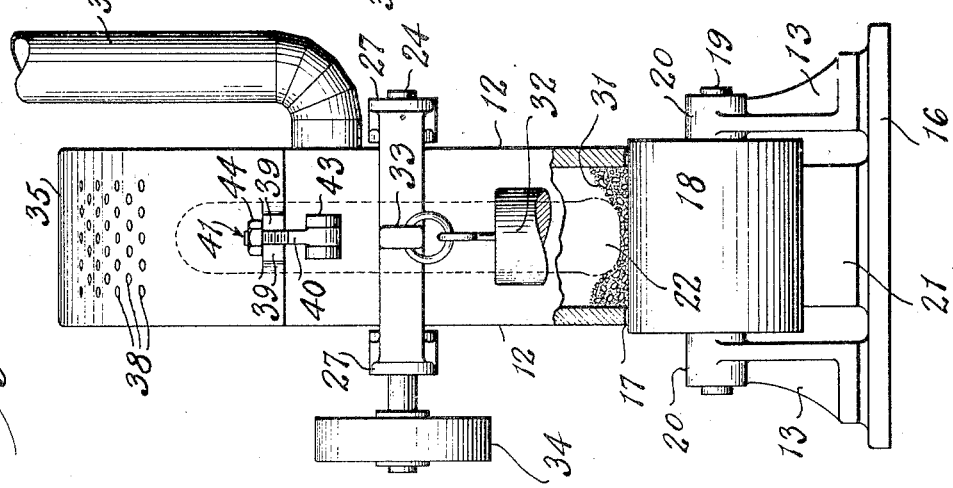
INVENTOR
Ernst Eger
BY
Ernest Hopkinson
ATTORNEY Patented May 21, 1929.

1,713,753

UNITED STATES PATENT OFFICE.

ERNST EGER, OF DETROIT, MICHIGAN, ASSIGNOR TO MORGAN AND WRIGHT, OF DETROIT, MICHIGAN, A CORPORATION OF MICHIGAN.

TIRE-TESTING MACHINE.

Application filed August 30, 1927. Serial No. 216,349.

This invention relates to machines for testing tires and more particularly to a machine for testing the resistance of tires against cutting or chipping, such as may occur when they are running upon gravel roads.

One of the objects of the invention is to provide means for subjecting a tire to conditions like those encountered in running upon a road of gravel or similar material, and to materially expedite the testing process so as to accomplish in a comparatively short period of time an accurate measure of its characteristics.

For the above purposes, there is provided a receptacle preferably including a rounded lower portion having at the bottom thereof an opening through which a revoluble support, usually a roller, projects. Means are provided for revolving and holding the tire against the roller while a quantity of loose gravel or other suitable abrasive material is fed continuously between the tire and the roller, so that during the test the tire is constantly subjected to conditions tending to cut or chip the tread and adjacent portions thereof. During the revolving of the tire the abrasive material is carried up on the rounded wall of the receptacle adjacent the rising side of the tire and some of it may return by gravity to a position between the tire and the roller. Other portions of the material are carried completely around with the tire by reason of the rotation thereof, and means are provided for deflecting this carried material downward at the descending side of the tire where it is again caught beneath the tire and the roller, thereby providing a continuous self-feeding of the abrasive material.

Another object of the invention is to provide means for preventing overheating of the tire and also to remove dust during the test.

Other features and advantages will appear as the description proceeds.

In the accompanying drawing,

Fig. 1 is a side elevation of the testing machine with parts broken away to show the interior; and Fig. 2 is an end elevation partly broken away adjacent the tread of the tire.

In the drawing the reference character 10 indicates generally a receptacle which includes a rounded bottom 11 and vertical side walls 12. The receptacle 10 may be supported upon a pair of standards 13 which include flange portions 14 through which fasteners 15 pass into threaded relation with the rounded portion 11, the supports 13 being carried upon a base 16. The rounded bottom 11 has a transverse opening therethrough, as indicated at 17, and a roller 18 preferably of steel with a hardened surface, is journalled by means of a cross shaft 19 in bearings 20, carried upon uprights 21 which are supported upon the base 16 between the standards 13. The roller 18 extends completely across the openings 17 and provides a rotatable support for a tire 22 carried upon a wheel 23 journalled by means of a shaft 24 passing through vertical slots 25 of the side walls 12 and then into suitable journals 26 of a pair of arms 27, the latter being pivoted at 28 to a bracket 29 fastened to the upper portion of the rounded bottom 11 by means of fasteners 30. The shaft 24 is releasably secured to the wheel 23 in any suitable manner and is adapted to support the wheel in a vertical position within the receptacle 10 so as to present the tread of the tire to the roller 18. A quantity of loose gravel or other suitable abrasive material 31 is placed in the receptacle 10 and forms a layer between the tire 22 and the roller 18. A weight 32 is secured to the joined free ends 33 of the arms 27 and is effective to press the tire 22 against the abrasive material 31 which is backed by the roller 18, thus simulating the effect of a car in pressing the tires in contact with a gravel road surface. For imparting rotation to the wheel 23, there may be provided a pulley 34 on the end of the shaft 24 and the pulley may be driven in any manner found desirable. In rotating the wheel in the direction indicated by the arrow in Fig. 1, it will be seen that the tire 22 will ride upon the abrasive material 31 and during such rotation the material will be carried along with the rising portion of the tire in the direction of the arrow and will build up a comparatively high level on that side, a part of which may find its way back by gravity to a position between the tire and the roller 18. Also some of the material will be projected upward and carried around with the tire, as illustrated in Fig. 1. It is proposed to deflect these upwardly projected particles by suitable means such as a cover or deflector 35 which may be hinged at 36 to the receptacle 10 for convenience in placing and removing the tire carrying wheel 23. The cover 35 preferably includes a curved inner wall 35' against which any flying particles may strike and be redirected downward at the descending side of the tire to thereafter form a supply which automatically feeds between the revolving tire 22 and the roller 18. Thus, during rotation the tire is constantly subjected to the abrasive action of the material 31 and there is a continuous carrying around and refeeding of the material between the tire 22 and the roller 18 so that at all times during the test there is a gravel or abrasive layer in contact with the tire surface.

In order to prevent over-heating of the tire, there is provided in one of the side walls 12 of the receptacle 10, an exhaust pipe 37 which is connected to suitable exhausting devices, and the cover 35 has the series of perforations 38 which admit new air to the chamber 10 as the heated air and dust are drawn off. The free side of the cover 35 may be provided with forked-shaped lugs 39 which receive the shank 40 of a swingable eye-bolt 41 pivoted by means of a cross pin 42 in ears 43 of the receptacle 10, a nut 44 being provided to securely hold the cover 35 in closed position. After the tire has been rotated in contact with the abrasive material 31 for a predetermined length of time, the cover 35 is swung open, the shaft 24 withdrawn, and the tire carrying wheel 23 removed, whereupon the surface of the tread and the adjacent parts of the tire may be inspected to determine the results of the test.

Having thus described my invention what I claim and desire to protect by Letters Patent is:

1. In a machine for testing tires, the combination of a receptacle containing a loose abrasive material, means for holding the tire under pressure against said material, and means for causing relative motion between the latter and the tire.

2. In a machine for testing tires, the combination of a receptacle containing loose abrasive material, means for holding the tire under pressure against said material, and means for rotating said tire while so held.

3. In a machine for testing tires, the combination of a receptacle containing a loose abrasive material, a support at the bottom of the receptacle and upon which the tire is adapted to rest with a quantity of said abrasive material between said support and the tire, and means for rotating the tire.

4. In a machine for testing tires, the combination of a receptacle containing a loose abrasive material, a support at the bottom of the receptacle and upon which the tire is adapted to rest with a quantity of said abrasive material between said support and the tire, means for rotating the tire, and means for directing said material as it is carried around in the direction of rotation of the tire, so that the material returns at the other side of said tire and then feeds between the same and the support.

5. In a machine for testing tires, the combination of a receptacle containing a loose abrasive material, means for rotating the tire, and a roller between which and the tire a layer of said abrasive material is disposed.

6. In a machine for testing tires, the combination of a receptacle containing loose abrasive material, the bottom of said receptacle having an opening therethrough, a roller supported from the outside and extending into the interior of the receptacle through said opening, means for supporting and holding a tire against the roller, means for rotating the tire while so held, and means for causing a continuous feeding of the abrasive material between the tire and the roller during rotation of said tire.

7. In a machine for testing tires, the combination of a receptacle including a rounded bottom having an opening therethrough, a roller, a support for presenting said roller through said opening and to the interior of said receptacle, a pair of arms adjacent opposite sides of the receptacle, a shaft carried by said arms and extending transversely across the interior of the receptacle, said shaft being releasably secured to the hub of a wheel carrying a tire to be tested, means for causing the arms to press the tire against the roller, means for driving the shaft whereby to rotate the tire, said rotation of the tire being effective to cause said abrasive material to be projected upward at the rising side of the tire, and a deflector for directing said material downward at the returning side of the tire so as to be refed between the same and the roller.

8. In a machine for testing tires, the combination of a receptacle including a rounded bottom having an opening therethrough, a roller extending through said opening, means for supporting and holding a tire against the roller, means for rotating the tire, said receptacle containing a quantity of abrasive material adapted to form a layer between the tire and the roller, said material being carried around with the tire during rotation thereof, and means for deflecting the carried material in a manner to cause it to return at the other side of the tire and to be refed between the latter and the roller.

9. In a machine for testing tires, the combination of a receptacle having a rounded bottom and rising side walls, the bottom of the receptacle having an opening therethrough, a roller extending into the opening, a pair of arms pivoted adjacent one of the ends of said receptacle and extending across the side walls, the latter having vertical openings, a shaft extending through said openings and having a wheel releasably secured thereto for carrying a tire to be tested, a pulley fixed to said shaft whereby to rotate the tire, said receptacle containing a quantity of loose abrasive material forming a layer between the tire and the roller, a weight carried by the free ends of said arms for holding said tire against said abrasive material and the roller, the tire being effective during rotation to carry said material upward and around therewith, and a cover for the receptacle, said cover having a rounded wall for deflecting the carried particles of material downward at the returning side of the tire so as to provide a continuous supply for feeding between the tire and the roller.

10. In a machine for testing tires, the combination of a receptacle having a rounded bottom and rising side walls, the bottom of the receptacle having an opening therethrough, a roller extending into the opening, a pair of arms pivoted adjacent one of the ends of said receptacle, said arms extending across the side walls and joined at their free ends, the side walls of the receptacle having vertical openings, a shaft extending through said openings and having a wheel releasably secured thereto for carrying a tire to be tested, a pulley fixed to said shaft whereby to rotate the tire, said receptacle containing a quantity of loose abrasive material forming a layer between the tire and the roller, a weight carried by the joined free ends of said arms for holding said tire against said abrasive material and the roller, the tire being effective during rotation to carry said material upward and around therewith, a cover for the receptacle, said cover having a rounded wall for deflecting the carried particles of material downward at the returning side of the tire so as to provide a continuous supply for feeding between the tire and the roller, and means for exhausting air and dust from said receptacle whereby to prevent overheating of the tire.

Signed at Detroit, county of Wayne, State of Michigan, this twenty-second day of August, 1927.

ERNST EGER.